March 24, 1936. A. DÜRIG 2,035,054
REVERSING GEAR COMPRISING PRESSURE OIL OPERATED CONTROL
COUPLINGS, PARTICULARLY FOR SHIPS' DRIVES
Filed March 28, 1935
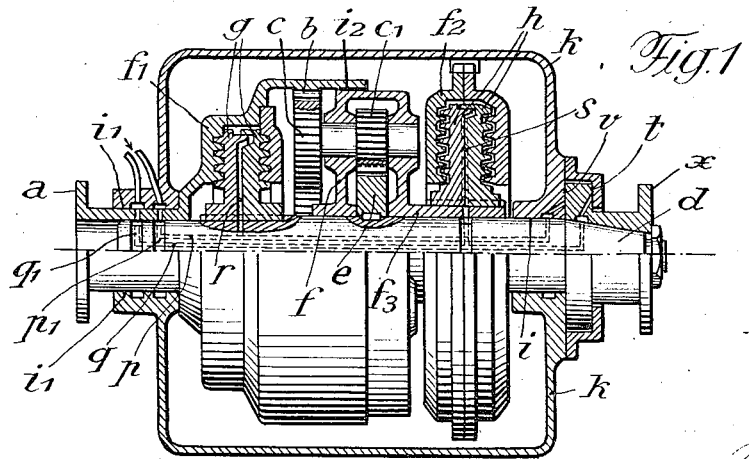
Inventor:
Alfred Dürig
By
Sommers + Young
Atty.

Patented Mar. 24, 1936

2,035,054

UNITED STATES PATENT OFFICE 2,035,054

REVERSING GEAR COMPRISING PRESSURE OIL OPERATED CONTROL COUPLINGS, PARTICULARLY FOR SHIPS' DRIVES

Alfred Dürig, Winterthur, Switzerland, assignor to the firm Schweizerische Lokomotiv & Maschinenfabrik, Winterthur, Switzerland Application March 28, 1935, Serial No. 13,550
In Germany March 31, 1934

7 Claims. (Cl. 74—298)

This invention relates to a reversing gear comprising pressure oil operated control couplings particularly for ships' drives, as specified in the U. S. A. Patent No. 1,896,440.

In the reversing gears for driving forwards and backwards as disclosed in the patent referred to above, the mounting carrying the orbital gear wheels of the epicyclic drive can be coupled either to the propeller shaft or to the fixed reversing gear box. This arrangement is disadvantageous in so far as during driving forwards, i. e. directly, without the gear teeth of the epicyclic drive rolling on each other, the driving pressure is transmitted continually through the same gear teeth that happen to intermesh at a time. Consequently, the lubricating material is expelled from between these teeth which thus contact with each other by bare metal portions, so that these portions are endangered to be damaged.

According to the present invention this drawback is eliminated by utilizing the clutch for forward motion for coupling the driving and the driven shafts to each other in a manner known per se, the two clutches being however no longer disposed side by side in the mounting of the orbital gear wheels on the same side of the latter but on different sides thereof, in such a way, that at the most the clutch for rearward motion is housed in the mounting of the orbital gear wheels.

In the accompanying drawing constructional forms of the invention are illustrated by way of example only, in which Fig. 1 shows an axial section of the reversing gear;

Fig. 2 is a cross section thereof;

Figs. 3 and 4 each show in a fragmentary section a different detail modification of Fig. 1;

Fig. 5 shows an axial section similar to Fig. 1 of a modified reversing gear, and Fig. 6 shows in a fragmentary section a detail modification of Fig. 6.

Referring to Fig. 1 of the drawing, the hollow shaft $a$ is driven by a motor not shown. This shaft carries on its right hand end a casing $f1$ for accommodating the clutch for directly coupling the driven shaft $d$ to the shaft $a$ and an interiorly toothed rim $b$ for actuating the epicyclic drive $c$, $c1$, $e$ by means of which the rearward motion is effected. The interior coupling disks $g$ for forward motion are connected to the driven shaft $d$ to be non-rotatable relative thereto but axially displaceable thereon. The driven shaft $d$ is mounted on the one hand in the hollow driving shaft $a$ and on the other hand in the gear box $k$ at $i$. On the shaft $d$ a mounting $f$ for the orbital gear wheels of the epicyclic drive is rotatably mounted which carries the gear wheels $c$, $c1$. The smaller gear wheel $c1$ meshes with a central gear or stud wheel $e$ which is keyed to the driven shaft $d$. On an extension $f3$ of the hub of the mounting $f$ are non-rotatably but axially displaceably arranged the inner coupling disks $h$ for rearward motion, the correlated exterior clutch portions in the form of a bipartite casing $f2$ being secured against rotation relative to the gear box $k$ by stop means. The driven shaft $d$ carries a flanged connecting head $x$ which is provided with bearing surfaces $v$, $t$ for taking the axial thrust of the propeller.

The clutches $g$ and $h$ can be connected by means of passages $p$ and $q$ which are supplied with pressure oil from the revolving grooves $p1$, $q1$ by means of a cock valve, not shown, of a type similar as disclosed in the earlier patent referred to above. The operation of disconnecting the clutches, i. e. forcing the correlated inner coupling disks against one another, can be effected by any suitable means, for example with the aid of pressure oil in the manner explained in said patent. The casing $f1$ is mounted in the gear box at $i1$ and further on the circumference $i2$ of the mounting $f$ of the orbital gear wheels in which way the reaction from the driving torque acting on the interiorly toothed rim is divided to these two bearings. This arrangement has the advantage that on removing the gear box cover, not shown, and unscrewing the bi-partite casing $f2$, the cooperating coupling faces of the clutch $k$ for rearward motion, which are most strained, can be inspected.

Fig. 2 shows the relative disposition of the orbital gear wheels $c$ and $c1$, the interiorly toothed rim $b$ and the stud or central gear wheel $e$.

Fig. 3 shows a modification of a detail of Fig. 1 which consists in the provision of a portion $f1$, which extends radially inwardly to end in a hub for receiving the driven shaft $d$. This provision permits of cutting the cylindric portion of the casing $f1$, at the right hand end thereof, back to the right hand end of the interiorly toothed rim $b$; since guiding the casing on the circumference of the mounting $f$ is thus no longer necessary.

A similar detail modification of the construction depicted in Fig. 1 is illustrated in Fig. 4 wherein the left hand hub portion $f'$ of the mounting $f$ is shown to be prolonged towards the clutch $g$. At the mating end of the casing $f1$ a correspondingly prolonged flange $f1''$ is arranged so as to surround the hub portion $f'$ and thus to provide a further bearing of the casing $f1$ together with the hub of the mounting $f$.

The construction as per Fig. 5 differs from that shown in Fig. 1 only by the feature, as explained in the patent hereinbefore referred to, that the mounting $f$ for the orbital gear wheels is adapted to be coupled fast to the gear box $k$ through the intermediary of the inner coupling disks $h$ which in this case are mounted on a sleeve $i4$ connected to the gear box so as to be non-rotatably but axially displaceably carried by this sleeve. This arrangement permits of mounting the casing $f1$ on the delivery side of the reversing gear, instead of on the exterior circumference of the mounting $f$ for the orbital gear wheels, as shown in Fig. 1, at the end of this mounting, at $i3$, thus on a portion of a smaller diameter by means of an extension of this casing $c$, so that the frictional losses arising during driving rearward are reduced. The thus extended casing $f1$ encloses all the inner parts of the reversing gear. By these means this rotary part $f1$, which is enveloped by the gear box $k$, is mounted in an improved manner, any tendency of the same of deviating out of axial alignment being obviated.

Alternatively, the extended casing $f1$ may be so modified at the right hand hub portion of the same that the latter is made of a larger inner diameter adapting it to surround a hub portion $f4$ of the mounting $f$ in which way provision is made for the casing $f1$ to take a bearing on the mounting $f$ instead of on the sleeve $i4$.

The operation of the reversing gears shown in the Figs. 1 to 4 and 5 and 6 respectively is as follows:

When it is desired to connect the reversing gearing for driving forwards, pressure oil is admitted to the space $r$ of the clutch $g$ by means of a valve not shown, whereupon the driven shaft $d$ is started to run by friction setting in between the cooperating ribbed and grooved portions of this clutch, thus permitting relative sliding between these portions until the driven shaft is finally moved along in unison. During the starting operation the bearing face $v$ is lubricated by pressure oil. When it is required to connect rearward motion, the said valve not shown is changed over, so that pressure oil is supplied to the space $s$ between the coupling disks $h$ instead of to the space $r$ and thus the mounting for the orbital gear wheels is braked so as to be arrested. In this way the driven shaft $d$ is compelled to rotate in the direction opposite to that of the driving shaft. At the same time as the space $s$ also the starting bearing surface $t$ is supplied with pressure oil for being lubricated. During driving forwards the orbital gear wheels gyrate idly in accordance with the rotation of the casing $f1$ without turning relative thereto. During driving rearwards the orbital gear wheels work at full load and turn in accordance with the ratio of gearing provided.

I do not limit myself to the particular size, shape, number or arrangement of parts as shown and described, all of which may be varied without going beyond the scope of my invention as shown, described and claimed.

What I claim is:

1. In a reversing gear particularly for ships' drives, in combination, a drive shaft and a driven shaft situated in a common axis, an epicyclic drive intercalated between said two shafts, a mounting member for the orbital gear wheels of said epicyclic drive loosely mounted relative to said driven shaft in coaxial relation therewith, two clutches adapted for driving forwards and rearwards respectively arranged on either side of said mounting member, said forward motion clutch permitting coupling said two shafts directly, inner and outer forward and rearward motion clutch portions, a casing incorporating said outer forward motion clutch portion rigidly connected to said driving shaft and enclosing said mounting member together with said orbital gear wheels and said inner rearward motion clutch portion, terminal bearing portions on said casing aligning with said axis situated adjacent to the respective ends of said gear box, and control means for selectively connecting said clutches for driving the driven shaft in either direction.

2. In a reversing gear particularly for ships' drives, in combination, a drive shaft and a driven shaft situated in a common axis, an epicyclic drive intercalated between said two shafts, a mounting member for the orbital gear wheels of said epicyclic drive loosely mounted relative to said driven shaft in coaxial relation therewith, two clutches adapted for driving forwards and rearwards respectively arranged on either side of said mounting member, said forward motion clutch permitting coupling said two shafts directly, inner and outer forward motion clutch portions, a casing incorporating said outer forward motion clutch portion rigidly connected to said driving shaft, a gear box enveloping said casing, terminal bearing portions on said casing aligning with said axis, one of said bearing portions being situated at the end of said gear box adjacent to the driving end of the reversing gear and the other of said bearing portions engaging the outer circumference of said mounting member, and control means for selectively connecting said clutches for driving the driven shaft in either direction.

3. In a reversing gear particularly for ships' drives, in combination, a pair of coaxial driving and driven shafts, a bearing sleeve for said driven shaft, an epicyclic drive intercalated between said two shafts, a mounting member for the orbital gear wheels of said epicyclic drive loosely mounted relative to said driven shaft in coaxial relation therewith, two clutches adapted for driving forwards and rearwards respectively arranged on either side of said mounting member, inner and outer forward motion clutch portions, inner and outer rearward motion clutch portions, said inner rearward motion clutch portion being non-rotatably but axially displaceably arranged on said bearing sleeve, a casing incorporating said outer forward motion clutch portions rigidly connected to said driving shaft, said inner forward motion clutch portion being fixed to said driven shaft, a gear box rigid with said bearing sleeve enveloping said casing, terminal bearing portions on said casing coaxial with said shafts, one of said bearing portions being situated at the end of said gear box adjacent to the driving end of the reversing gear and the other of said bearing portions surrounding said bearing sleeve, and control means for selectively connecting said clutches for driving the driven shaft in either direction.

4. In an enclosed reversing gear particularly for ships' drives, in combination, a drive shaft and a driven shaft situated in a common axis, an epicyclic drive intercalated between said two shafts, a mounting member for the orbital gear wheels of said epicyclic drive loosely mounted relative to said driven shaft in coaxial relation therewith, two clutches for driving forwards and rearwards respectively arranged on opposite sides of said mounting member, said forward motion clutch permitting coupling said two shafts directly by rigidly connecting with both of said shafts in the circumferential direction, inner and outer rearward motion clutch portions, one of the same forming with said mounting member a circumferentially rigid coaxial unit, and the other being rigid with the gear casing, and control means for selectively connecting said clutches for driving the driven shaft in either direction without circumferential vibration.

5. In an encased reversing gear particularly for ships' drives, in combination, a drive shaft and a driven shaft situated in a common axis, an epicyclic drive intercalated between said two shafts, a mounting member for the orbital gear wheels of said epicyclic drive loosely mounted relative to said driven shaft in coaxial relation therewith, two clutches for driving forwards and rearwards respectively arranged on opposite sides of said mounting member, inner and outer forward motion clutch portions, said inner forward motion clutch portion connecting circumferentially rigidly with said driven shaft, an interior casing rigid with said outer forward motion clutch portion rigidly connected to said driving shaft, inner and outer rearward motion clutch portions, said inner rearward motion clutch portion connecting circumferentially rigidly with said mounting member, and said outer rearward motion clutch portion being rigid with the gear casing, and control means for selectively connecting said clutches for driving the driven shaft in either direction without circumferential vibration.

6. In an encased reversing gear particularly for ships' drives, in combination, a drive shaft and a driven shaft situated in a common axis, an epicyclic drive intercalated between said two shafts, a mounting member for the orbital gear wheels of said epicyclic drive loosely mounted relative to said driven shaft in coaxial relation therewith, two clutches for driving forwards and rearwards respectively arranged on opposite sides of said mounting member, inner and outer forward motion clutch portions, said inner forward motion clutch portion connecting circumferentially rigidly with said driven shaft, an interior casing rigid with said outer forward motion clutch portion rigidly connected to said driving shaft, inner and outer rearward motion clutch portions rigid with the gear casing and said mounting member respectively, said rearward motion clutch being built into said member, and control means for selectively connecting said clutches for driving the driven shaft in either direction without circumferential vibration.

7. In an encased reversing gear particularly for ships' drives, in combination, a drive shaft and a driven shaft situated in a common axis, an epicyclic drive intercalated between said two shafts, a mounting member for the orbital gear wheels of said epicyclic drive loosely mounted relative to said driven shaft in coaxial relation therewith, two clutches for driving forwards and rearwards respectively arranged on opposite sides of said mounting member, inner and outer forward motion clutch portions, said inner forward motion clutch portion connecting circumferentially rigidly with said driven shaft, an interior casing rigid with said outer forward motion clutch portion rigidly connected to said driving shaft, inner and outer rearward motion clutch portions, said inner rearward motion clutch portion connecting circumferentially rigidly with said mounting member, key means intercalated between the gear casing and said outer rearward motion clutch portion for fixing the latter to said casing, and control means for selectively connecting said clutches for driving the driven shaft in either direction.

ALFRED DÜRIG.